US012764667B2

(12) United States Patent
Sreejith et al.

(10) Patent No.: US 12,764,667 B2
(45) Date of Patent: Oct. 13, 2026

(54) UPLINK TRANSMISSION USING LOW POWER RADIO

(71) Applicant: LENOVO (SINGAPORE) PTE. LTD., Singapore (SG)

(72) Inventors: Shwetha Sreejith, Steinbach (DE); Joachim Löhr, Wiesbaden (DE); Prateek Basu Mallick, Dreieich (DE); Karthikeyan Ganesan, Kronberg im Taunus (DE)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 321 days.

(21) Appl. No.: 18/660,199

(22) Filed: May 9, 2024

(65) Prior Publication Data

US 2025/0351078 A1 Nov. 13, 2025

(51) Int. Cl.

*H04W 52/02* (2009.01)
*H04W 28/02* (2009.01)
*H04W 72/21* (2023.01)

(52) U.S. Cl.

CPC ... *H04W 52/0274* (2013.01); *H04W 28/0278* (2013.01); *H04W 52/0235* (2013.01); *H04W 72/21* (2023.01)

(58) Field of Classification Search

CPC ........... H04W 28/0278; H04W 52/0209–0296; H04W 72/21

See application file for complete search history.

(56) References Cited

U.S. PATENT DOCUMENTS

2012/0307700 A1* 12/2012 Nordberg .......... H04W 28/0278 370/311
2023/0397107 A1 12/2023 Elshafie et al.
2024/0032042 A1* 1/2024 Abotabl ................ H04W 72/20
2024/0032402 A1 1/2024 Shi et al.
2025/0106887 A1 3/2025 Sreejith et al.

FOREIGN PATENT DOCUMENTS

WO WO-2024237628 A1 * 11/2024 ............ H04W 52/02
WO 2025203009 A1 10/2025

OTHER PUBLICATIONS

"International Search Report and Written Opinion", International Application No. PCT/IB2025/054849, Aug. 1, 2025, 11 pages.

"Physical layer procedures for control", 3rd Generation Partnership Project; Technical Specification Group Radio Access Network, 3GPP TS 38.213 V16.7.0, 3GPP Organizational Partners, Valbonne, France [retrieved Feb. 2, 2022]. Retrieved from the Internet <http://www.3gpp.org>., Sep. 2021, 188 Pages.

(Continued)

*Primary Examiner* — Brendan Y Higa
(74) *Attorney, Agent, or Firm* — FIG. 1 Patents

(57) ABSTRACT

Various aspects of the present disclosure relate to uplink transmission using a low power radio. An apparatus, such as a UE, receives uplink (UL) data into a medium access control (MAC) hybrid automatic repeat request (HARQ) buffer. The UE wakes up a low power radio of the UE based on the uplink data received in the MAC HARQ buffer. The UE initiates a buffer status report and/or a scheduling request, and the UE transmits, to a network equipment (NE), the buffer status report, the scheduling request, or both the buffer status report and the scheduling request.

20 Claims, 8 Drawing Sheets

(56) References Cited

OTHER PUBLICATIONS

3rd Generation Partnership Proje , “Summary Report from 3GPP plenaries (mainly RAN) #102”, [retrieved Jul. 21, 2024] retrieved from the internet <https://standards-tracker.5g-ppp.eu/online-tool-standards-tracker/summary-report-3gpp-plenaries-mainly-ran-102-edinburgh-uk-11-15>, Dec. 11, 2023, 22 pages.
Sreejith, Shwtha , “Pursuant to MPEP § 2001.06(b) the applicant brings the following co-pending application to the Examiner’s attention:”, U.S. Appl. No. 63/585,283, filed Sep. 26, 2023, 32 pages.

* cited by examiner

```
LogicalChannelConfig ::=            SEQUENCE {
    ul-SpecificParameters               SEQUENCE {
        priority                            INTEGER (1..16),
        prioritisedBitRate                  ENUMERATED {kBps0, kBps8, kBps16, kBps32, kBps64,
kBps128, kBps256, kBps512,
                                            kBps1024, kBps2048, kBps4096, kBps8192, kBps16384,
kBps32768, kBps65536, infinity},
        bucketSizeDuration                  ENUMERATED {ms5, ms10, ms20, ms50, ms100, ms150, ms300,
ms500, ms1000,
                                                            spare7, spare6, spare5, spare4,
spare3,spare2, spare1},
        allowedServingCells                 SEQUENCE (SIZE (1..maxNrofServingCells-1)) OF
ServCellIndex

OPTIONAL,   -- Cond PDCP-CADuplication
        allowedSCS-List                     SEQUENCE (SIZE (1..maxSCSs)) OF SubcarrierSpacing
OPTIONAL,   -- Need R
        maxPUSCH-Duration                   ENUMERATED {ms0p02, ms0p04, ms0p0625, ms0p125, ms0p25,
ms0p5, ms0p01-v1700, spare1}

OPTIONAL,   -- Need R
        configuredGrantType1Allowed         ENUMERATED {true}
OPTIONAL,   -- Need R
        logicalChannelGroup                 INTEGER (0..maxLCG-ID)
OPTIONAL,   -- Need R
        schedulingRequestID                 SchedulingRequestId
OPTIONAL,   -- Need R
        logicalChannelSR-Mask               BOOLEAN,
        logicalChannelSR-DelayTimerApplied  BOOLEAN,
        ...,
        bitRateQueryProhibitTimer       ENUMERATED {s0, s0dot4, s0dot8, s1dot6, s3, s6, s12, s30}
OPTIONAL,   -- Need R
        allowedRadio-mode-r19               ENUMERATED {LRonly, MRonly, LRMR}
OPTIONAL,   -- Need R
        [[
        allowedCG-List-r16                  SEQUENCE (SIZE (0.. maxNrofConfiguredGrantConfigMAC-1-
r16)) OF ConfiguredGrantConfigIndexMAC-r16

OPTIONAL,   -- Need S
        allowedPHY-PriorityIndex-r16        ENUMERATED {p0, p1}
OPTIONAL    -- Need S
        ]],
        [[
        logicalChannelGroupIAB-Ext-r17      INTEGER (0..maxLCG-ID-IAB-r17)
OPTIONAL,   -- Need R
        allowedHARQ-mode-r17                ENUMERATED {harqModeA, harqModeB}
OPTIONAL    -- Need R
        ]]
    }
OPTIONAL,   -- Cond UL
    ...,
    [[
    channelAccessPriority-r16           INTEGER (1..4)
OPTIONAL,   -- Need R
    bitRateMultiplier-r16               ENUMERATED {x40, x70, x100, x200}
OPTIONAL    -- Need R
    ]]
}
```

202

200

Figure 2

UPLINK TRANSMISSION USING LOW POWER RADIO

TECHNICAL FIELD

The present disclosure relates to wireless communications, and more specifically to uplink transmission of wireless communications.

BACKGROUND

A wireless communications system may include one or multiple network communication devices, such as base stations, which may support wireless communications for one or multiple user communication devices, which may be otherwise known as user equipment (UE), or other suitable terminology. The wireless communications system may support wireless communications with one or multiple user communication devices by utilizing resources of the wireless communication system (e.g., time resources (e.g., symbols, slots, subframes, frames, or the like) or frequency resources (e.g., subcarriers, carriers, or the like). Additionally, the wireless communications system may support wireless communications across various radio access technologies including third generation (3G) radio access technology, fourth generation (4G) radio access technology, fifth generation (5G) radio access technology, among other suitable radio access technologies beyond 5G (e.g., sixth generation (6G)).

The wireless communications system may support wireless communications, and may include one or more devices, such as UEs, base stations (e.g., gNBs), network entities, satellites, and/or network equipment (NE), among other devices, that transmit and/or receive signaling. A UE in the wireless communications system may include both a main radio and a low power radio. The main radio of the UE attains service from a gNB. The low power radio of the UE may be used to offload some functionalities of the main radio, which can conserve battery power of the device. The main radio of the UE can remain in a power conserve state (e.g., a sleep mode) while the UE operates with the low power radio. Although this configuration allows for a power savings, capabilities of the UE may be reduced with the low power radio, rather than the UE operating with the main radio.

SUMMARY

An article "a" before an element is unrestricted and understood to refer to "at least one" of those elements or "one or more" of those elements. The terms "a," "at least one," "one or more," and "at least one of one or more" may be interchangeable. As used herein, including in the claims, "or" as used in a list of items (e.g., a list of items prefaced by a phrase such as "at least one of" or "one or more of" or "one or both of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on". Further, as used herein, including in the claims, a "set" may include one or more elements.

Some implementations of the method and apparatuses described herein may include a UE for wireless communication to receive uplink (UL) data into a medium access control (MAC) hybrid automatic repeat request (HARQ) buffer. The UE wakes up a low power radio of the UE based at least in part on the UL data received in the MAC HARQ buffer. The UE initiates at least one of a buffer status report or a scheduling request, and the UE transmits, to a network equipment (NE), at least one of the buffer status report or the scheduling request.

In some implementations of the method and apparatuses described herein, a logical channel (LCH) via which the UL data is received is configured with a radio mode. The UE receives, from the NE, a radio resource control (RRC) message that indicates a configuration of the radio mode. The UE receives, from the NE, a LogicalChannelConfig information element (IE) that includes a parameter to configure the radio mode. The parameter is an enumerated value indicating the low power radio, a main radio, or both the low power radio and the main radio. The parameter is a Boolean value of true indicating the low power radio, or a Boolean value of false indicating at least one of a main radio, or both the low power radio and the main radio. The LCH via which the UL data is received is configured with the Boolean value of false, and the UE wakes up the main radio for UL transmission of the UL data. A LCH with a high priority is configurable with a high bucket size value that is a product of a prioritized bit rate and a bucket size duration. The UE receives an UL grant; and allocates the UL grant to the LCH based on LCH priority and if a radio mode configured for the LCH is at least one of the low power radio, or both the low power radio and a main radio. The UE transmits the scheduling request as one of a physical uplink control channel (PUCCH) message with an indication that the low power radio initiated the scheduling request, or as the PUCCH message dedicated for a LCH configured for low power radio mode. The UE transmits the buffer status report that includes an indication that the UL data in a logical channel group (LCG) is one of only associated with the low power radio, or associated with a main radio, or both the low power radio and the main radio.

Some implementations of the method and apparatuses described herein may further include a processor for wireless communication to receive UL data into a MAC HARQ buffer; wake up a low power radio based at least in part on the UL data received in the MAC HARQ buffer; initiate at least one of a buffer status report or a scheduling request; and transmit, to a NE, at least one of the buffer status report or the scheduling request.

Some implementations of the method and apparatuses described herein may further include a method performed by a UE, the method including receiving UL data into a MAC HARQ buffer; waking up a low power radio of the UE based at least in part on the UL data received in the MAC HARQ buffer; initiating at least one of a buffer status report or a scheduling request; and transmitting, to a NE, at least one of the buffer status report or the scheduling request.

In some implementations of the method and apparatuses described herein, the method further comprising receiving, from the NE, a RRC message that indicates a configuration of a radio mode associated with a LCH via which the UL data is received. The method further comprising receiving, from the NE, a LogicalChannelConfig IE that includes a parameter to configure a radio mode associated with a LCH via which the UL data is received.

Some implementations of the method and apparatuses described herein may further include a NE for wireless communication to receive, from a UE, at least one of a buffer status report or a scheduling request. The NE transmits, to the UE, a configuration of UL resources via which the UE transmits, with a low power radio, UL data from a MAC HARQ buffer of the UE.

In some implementations of the method and apparatuses described herein, the NE transmits, to the UE, a RRC message that indicates a radio mode configuration of a radio mode that is associated with a LCH for the UL data. The NE transmits, to the UE, a LogicalChannelConfig IE that includes a parameter to configure a radio mode that is associated with a LCH for the UL data. The parameter is an enumerated value indicating the low power radio of the UE, a main radio of the UE, or both the low power radio and the main radio. The parameter is a Boolean value of true indicating the low power radio of the UE, or a Boolean value of false indicating at least one of a main radio of the UE, or both the low power radio and the main radio.

Some implementations of the method and apparatuses described herein may further include a method performed by a NE, the method including receiving, from a UE, at least one of a buffer status report or a scheduling request; and transmitting, to the UE, a configuration of UL resources via which the UE transmits, with a low power radio, UL data from a MAC HARQ buffer of the UE.

In some implementations of the method and apparatuses described herein, the method further comprising transmitting, to the UE, a RRC message that indicates a radio mode configuration of a radio mode that is associated with a LCH for the UL data. The method further comprising transmitting, to the UE, a LogicalChannelConfig IE that includes a parameter to configure a radio mode that is associated with a LCH for the UL data. The method, wherein the parameter is an enumerated value indicating the low power radio of the UE, a main radio of the UE, or both the low power radio and the main radio. The method, wherein the parameter is a Boolean value of true indicating the low power radio of the UE, or a Boolean value of false indicating at least one of a main radio of the UE, or both the low power radio and the main radio.

BRIEF DESCRIPTION OF THE DRAWINGS

FIG. 2 illustrates an example information element (IE), in accordance with aspects of the present disclosure.

DETAILED DESCRIPTION

Figure 1:
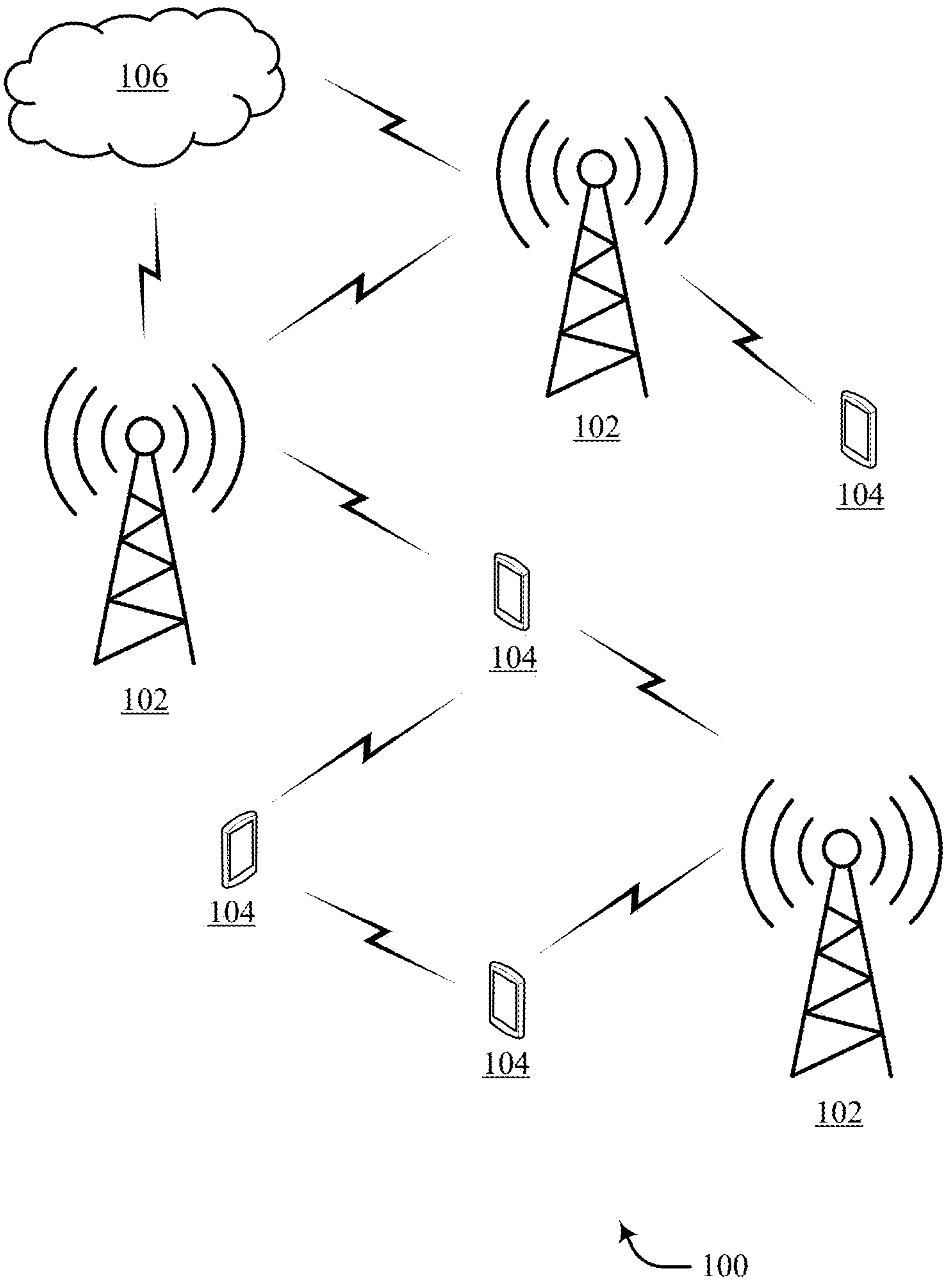
FIG. 1 illustrates an example of a wireless communications system in accordance with aspects of the present disclosure.

In a wireless communications system, a UE and a NE (e.g., a base station, gNB) may support wireless communication (e.g., reception and/or transmission of wireless communication) using time-frequency resources. A NE may schedule (e.g., allocate, assign) one or more time-frequency resources via control signaling (e.g., a radio resource control (RRC) message, downlink control information (DCI), data packets, etc.) for the wireless communication. A UE may be equipped with multiple radios, such as a primary radio and a secondary radio to support various operations (e.g., receiving, transmitting, monitoring, communicating). The primary radio of the UE may be referred to as a main radio (MR) and the secondary radio may be referred to as a low power radio (LR). The UE may be capable of, configured to, or operable to support multiple power modes. For example, the UE may operate in an active mode with relatively high power consumption or in an idle or inactive mode with a relatively low power consumption compared to the active mode.

In the low power mode (e.g., idle and/or inactive mode), the UE may operate using reduced transmission and/or reception capabilities (e.g., due to reduced transmit power, energy efficient radio transceivers, low power processors, etc.), and may perform energy saving techniques to supplement battery power, utilize sleep modes for different circuitry (e.g., hardware) of the UE, etc. In some examples, the low power radio of the UE may be referred to as a low power wake up radio (LP-WUR). The UE may wake up or power on the MR in response to different events associated with the LR (LP-WUR), for example, reception of a low-power wake-up signal (LP-WUS) at the UE. In some cases, the use of the LR may present challenges pertaining to power saving and wireless coverage.

The LR of a conventional UE is a receive only radio that can receive a low power wake up signal in order to wake up the MR. Given that the LR of a conventional UE is incapable of any transmissions, the MR needs to be operational (e.g., awake) to transmit any UL data, and the UL transmissions may include signaling data, control elements, a scheduling request (SR) and/or a BSR transmission, user data transmissions, measurement reporting (e.g., channel state information (CSI), radio resource management (RRM), etc.). Further, the wake up time of the MR in a UE from ultra-deep sleep state includes the ramp-up time of the MR plus the time taken for synchronization, which could be as high as 800 ms. This means that the UE might need to wait up to 800 ms before some UL transmissions can be performed if the MR had been in ultra-deep sleep state when UL data entered its buffers. This adds a considerable latency in data transmission, which may affect user experience, particularly for delay sensitive services, such as extended Reality (XR) services.

Aspects of this disclosure include implementations that provide the LR of a UE can transmit UL data in UL transmissions so that the MR of the UE may remain in the sleep mode for a maximum possible time, allowing for increased power saving gain. Accordingly, the LR of the UE can facilitate UL transmissions, and the UE can maximize its power saving gain while also avoiding any additional latencies that may be caused by the wake up of the MR of the UE. Features of the described aspects provide that the LR of a UE can transmit UL data based on the urgency and/or priority of the UL data. This overcomes notable disadvantages of a conventional UE, including the power saving gain offered by having the LR is minimized when the MR needs to frequently wake up for UL transmissions. The wake up time of MR from ultra deep-sleep includes the ramp up time and the time taken for synchronization, which adds a considerable latency for UL transmission if the MR has to wake up from ultra deep-sleep. Further, the MR of the UE cannot remain in the sleep state even if the UL data that needs to be transmitted is of low urgency and/or priority and does not need to be immediately transmitted.

Accordingly, the described techniques can enable power conservation while maintaining signal fidelity in a wireless communications system, particularly in low power operation scenarios. The present disclosure describes implementations and features that can be implemented for the MR wake up behavior for a UE that supports the LR in RRC_CONNECTED mode. The disclosed features include implementations for different wake up scenarios of the MR for urgent and/or high priority versus non-urgent and/or low priority data, and how this prioritization may be differentiated. For example, the modification of the MR wake up to be delayed enhances the existing wake up behavior of the MR, and in implementations, the wake up of the MR can be delayed such that the MR can continue in the sleep mode if the UL data that has entered its buffer is of low priority, low urgency, and or is smaller in size, which allows for an increased power saving gain. Further, this disclosure provides for a new BSR trigger that is defined based on the MR wake up, ensuring that any new data that enters the UE buffer will be reported in case a regular BSR is not triggered.

Aspects of the disclosure include LCH configuration, where the network (e.g., a gNB) configures particular LCHs to the LR, other particular LCHs to the MR, and some common LCHs configured to both the LR and the MR. In an implementation, a RRC message includes a new parameter that may indicate whether only a LR mode is allowed, only a MR mode is allowed, or both of the LR mode and the MR mode are allowed.

Additional aspects of this disclosure include transmission behavior of a UE using the LR and/or the MR of the device. In these implementations, either the LR or the MR may transmit UL data based on certain criteria, where this criteria is used to distinguish whether the data is urgent or not. Accordingly, the LR can assist the MR with UL transmission, enabling the MR to remain in a sleep mode (e.g., ultra-deep sleep, deep sleep, light sleep, or micro sleep mode) as long as the LR is actively receiving and transmitting, in turn increasing the power saving gain offered by the LR. In an implementation, the LR may be restricted to conduct UL transmissions only when data enters the HARQ buffer while the MR is already in the sleep mode, and/or when new data enters the buffer that was previously empty. In another implementation, the LR and the MR may be simultaneously awake and may each transmit data based on urgency and/or priority criteria thresholds for UL data transmission.

Additional aspects of this disclosure include triggering or initiating a scheduling request (SR). In implementations, an RRC message can configure a set of PUCCH resources (SR configuration) to the UE on a per LCH basis, wherein each SR configuration corresponds to one or more LCHs. In the case of the LR, the SR configuration of the LCH that triggers a BSR is considered the corresponding SR configuration for the triggered SR. In one or more implementations, when the LR of a UE triggers a SR, PUCCH formats 0 or 1 may be used to transmit the SR, where this is a SR only PUCCH message and PUCCH formats 0 or 1 may contain up to 2 uplink control information (UCI) bits. In the SR transmission occasion within a PUCCH message format 0 or 1, one UCI bit is allocated for the SR, and the spare UCI bit within the SR transmission occasion can be used to distinguish between whether the LR or the MR of the UE triggered the SR. For example, a spare UCI bit value ‘0’ may indicate that the LR triggered the SR, whereas a spare UCI bit value ‘1’ may indicate that the MR triggered the SR. In another example, the PUCCH sparsity (SR configuration) may also be adjusted for the LR such that the power saving gain is maximized.

Aspects of the present disclosure are described in the context of a wireless communications system.

FIG. 1 illustrates an example of a wireless communications system 100 in accordance with aspects of the present disclosure. The wireless communications system 100 may include one or more NE 102, one or more UE 104, and a core network (CN) 106. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a NR network, such as a 5G network, a 5G-Advanced (5G-A) network, or a 5G ultrawideband (5G-UWB) network. In other implementations, the wireless communications system 100 may be a combination of a 4G network and a 5G network, or other suitable radio access technology including Institute of Electrical and Electronics Engineers (IEEE) 802.11 (Wi-Fi), IEEE 802.16 (WiMAX), IEEE 802.20. The wireless communications system 100 may support radio access technologies beyond 5G, for example, 6G. Additionally, the wireless communications system 100 may support technologies, such as time division multiple access (TDMA), frequency division multiple access (FDMA), or code division multiple access (CDMA), etc.

The one or more NE 102 may be dispersed throughout a geographic region to form the wireless communications system 100. One or more of the NE 102 described herein may be or include or may be referred to as a network node, a base station, a network element, a network function, a network entity, a radio access network (RAN), a NodeB, an eNodeB (eNB), a next-generation NodeB (gNB), or other suitable terminology. An NE 102 and a UE 104 may communicate via a communication link, which may be a wireless or wired connection. For example, an NE 102 and a UE 104 may perform wireless communication (e.g., receive signaling, transmit signaling) over a Uu interface.

An NE 102 may provide a geographic coverage area for which the NE 102 may support services for one or more UEs 104 within the geographic coverage area. For example, an NE 102 and a UE 104 may support wireless communication of signals related to services (e.g., voice, video, packet data, messaging, broadcast, etc.) according to one or multiple radio access technologies. In some implementations, an NE 102 may be moveable, for example, a satellite associated with a non-terrestrial network (NTN). In some implementations, different geographic coverage areas associated with the same or different radio access technologies may overlap, but the different geographic coverage areas may be associated with different NE 102.

The one or more UEs 104 may be dispersed throughout a geographic region of the wireless communications system 100. A UE 104 may include or may be referred to as a remote unit, a mobile device, a wireless device, a remote device, a subscriber device, a transmitter device, a receiver device, or some other suitable terminology. In some implementations, the UE 104 may be referred to as a unit, a station, a terminal, or a client, among other examples. Additionally, or alternatively, the UE 104 may be referred to as an Internet-of-Things (IoT) device, an Internet-of-Everything (IoE) device, or machine-type communication (MTC) device, among other examples.

A UE 104 may be able to support wireless communication directly with other UEs 104 over a communication link. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link may be referred to as a sidelink. For example, a UE 104 may support wireless communication directly with another UE 104 over a PC5 interface.

An NE 102 may support communications with the CN 106, or with another NE 102, or both. For example, an NE 102 may interface with other NE 102 or the CN 106 through one or more backhaul links (e.g., S1, N2, N6, or other network interface). In some implementations, the NE 102 may communicate with each other directly. In some other implementations, the NE 102 may communicate with each other indirectly (e.g., via the CN 106). In some implementations, one or more NE 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

The CN 106 may support user authentication, access authorization, tracking, connectivity, and other access, routing, or mobility functions. The CN 106 may be an evolved packet core (EPC), or a 5G core (5GC), which may include a control plane entity that manages access and mobility (e.g., a mobility management entity (MME), an access and mobility management functions (AMF)) and a user plane entity that routes packets or interconnects to external networks (e.g., a serving gateway (S-GW), a packet data network (PDN) gateway (P-GW), or a user plane function (UPF)). In some implementations, the control plane entity may manage non-access stratum (NAS) functions, such as mobility, authentication, and bearer management (e.g., data bearers, signal bearers, etc.) for the one or more UEs 104 served by the one or more NE 102 associated with the CN 106.

The CN 106 may communicate with a packet data network over one or more backhaul links (e.g., via an S1, N2, N6, or other network interface). The packet data network may include an application server. In some implementations, one or more UEs 104 may communicate with the application server. A UE 104 may establish a session (e.g., a protocol data unit (PDU) session, or the like) with the CN 106 via an NE 102. The CN 106 may route traffic (e.g., control information, data, and the like) between the UE 104 and the application server using the established session (e.g., the established PDU session). The PDU session may be an example of a logical connection between the UE 104 and the CN 106 (e.g., one or more network functions of the CN 106).

In the wireless communications system 100, the NEs 102 and the UEs 104 may use resources of the wireless communications system 100 (e.g., time resources (e.g., symbols, slots, subframes, frames, or the like) or frequency resources (e.g., subcarriers, carriers)) to perform various operations (e.g., wireless communications). In some implementations, the NEs 102 and the UEs 104 may support different resource structures. For example, the NEs 102 and the UEs 104 may support different frame structures. In some implementations, such as in 4G, the NEs 102 and the UEs 104 may support a single frame structure. In some other implementations, such as in 5G and among other suitable radio access technologies, the NEs 102 and the UEs 104 may support various frame structures (i.e., multiple frame structures). The NEs 102 and the UEs 104 may support various frame structures based on one or more numerologies.

One or more numerologies may be supported in the wireless communications system 100, and a numerology may include a subcarrier spacing and a cyclic prefix. A first numerology (e.g., $\mu=0$) may be associated with a first subcarrier spacing (e.g., 15 kHz) and a normal cyclic prefix. In some implementations, the first numerology (e.g., $\mu=0$) associated with the first subcarrier spacing (e.g., 15 kHz) may utilize one slot per subframe. A second numerology (e.g., $\mu=1$) may be associated with a second subcarrier spacing (e.g., 30 kHz) and a normal cyclic prefix. A third numerology (e.g., $\mu=2$) may be associated with a third subcarrier spacing (e.g., 60 kHz) and a normal cyclic prefix or an extended cyclic prefix. A fourth numerology (e.g., $\mu=3$) may be associated with a fourth subcarrier spacing (e.g., 120 kHz) and a normal cyclic prefix. A fifth numerology (e.g., $\mu=4$) may be associated with a fifth subcarrier spacing (e.g., 240 kHz) and a normal cyclic prefix.

A time interval of a resource (e.g., a communication resource) may be organized according to frames (also referred to as radio frames). Each frame may have a duration, for example, a 10 millisecond (ms) duration. In some implementations, each frame may include multiple subframes. For example, each frame may include 10 subframes, and each subframe may have a duration, for example, a 1 ms duration. In some implementations, each frame may have the same duration. In some implementations, each subframe of a frame may have the same duration.

Additionally or alternatively, a time interval of a resource (e.g., a communication resource) may be organized according to slots. For example, a subframe may include a number (e.g., quantity) of slots. The number of slots in each subframe may also depend on the one or more numerologies supported in the wireless communications system 100. For instance, the first, second, third, fourth, and fifth numerologies (i.e., $\mu=0$, $\mu=1$, $\mu=2$, $\mu=3$, $\mu=4$) associated with respective subcarrier spacings of 15 kHz, 30 kHz, 60 kHz, 120 kHz, and 240 kHz may utilize a single slot per subframe, two slots per subframe, four slots per subframe, eight slots per subframe, and 16 slots per subframe, respectively. Each slot may include a number (e.g., quantity) of symbols (e.g., OFDM symbols). In some implementations, the number (e.g., quantity) of slots for a subframe may depend on a numerology. For a normal cyclic prefix, a slot may include 14 symbols. For an extended cyclic prefix (e.g., applicable for 60 kHz subcarrier spacing), a slot may include 12 symbols. The relationship between the number of symbols per slot, the number of slots per subframe, and the number of slots per frame for a normal cyclic prefix and an extended cyclic prefix may depend on a numerology. It should be understood that reference to a first numerology (e.g., $\mu=0$) associated with a first subcarrier spacing (e.g., 15 kHz) may be used interchangeably between subframes and slots.

In the wireless communications system 100, an electromagnetic (EM) spectrum may be split, based on frequency or wavelength, into various classes, frequency bands, frequency channels, etc. By way of example, the wireless communications system 100 may support one or multiple operating frequency bands, such as frequency range designations FR1 (410 MHz-7.125 GHz), FR2 (24.25 GHz-52.6 GHz), FR3 (7.125 GHz-24.25 GHz), FR4 (52.6 GHz-114.25 GHz), FR4a or FR4-1 (52.6 GHz-71 GHz), and FR5 (114.25 GHz-300 GHz). In some implementations, the NEs 102 and the UEs 104 may perform wireless communications over one or more of the operating frequency bands. In some implementations, FR1 may be used by the NEs 102 and the UEs 104, among other equipment or devices for cellular communications traffic (e.g., control information, data). In some implementations, FR2 may be used by the NEs 102 and the UEs 104, among other equipment or devices for short-range, high data rate capabilities.

FR1 may be associated with one or multiple numerologies (e.g., at least three numerologies). For example, FR1 may be associated with a first numerology (e.g., $\mu=0$), which includes 15 kHz subcarrier spacing; a second numerology (e.g., $\mu=1$), which includes 30 kHz subcarrier spacing; and a third numerology (e.g., $\mu=2$), which includes 60 kHz subcarrier spacing. FR2 may be associated with one or multiple numerologies (e.g., at least 2 numerologies). For example, FR2 may be associated with a third numerology (e.g., $\mu=2$), which includes 60 kHz subcarrier spacing; and a fourth numerology (e.g., $\mu=3$), which includes 120 kHz subcarrier spacing.

According to implementations, one or more of the NEs 102 and the UEs 104 are operable to implement various aspects of the techniques described with reference to the present disclosure. For example, a UE 104 includes both a main radio (MR) and a low power radio (LR). The UE 104 receives UL data into a MAC HARQ buffer of the device. The UE 104 can wake up a low power radio of the UE based on the UL data received in the MAC HARQ buffer. The UE 104 can then initiate a buffer status report and/or a scheduling request, and transmit to a NE 102, the buffer status report and/or the scheduling request. The NE 102 (e.g., a base station, gNB) receives, from the UE 104, the buffer status report and/or the scheduling request. The NE 102 may then transmit, to the UE 104, a configuration of UL resources via which the UE transmits, with the low power radio, the UL data from the MAC HARQ buffer of the UE.

With reference to a UE 104 in a wireless communications system, the UE may include both a main radio (MR) and a low power radio (LR). The low power radio of the UE may be used to offload some functionalities of the main radio, which can conserve battery power of the device. The main radio of the UE can remain in a power conserve state (e.g., a sleep mode) while the UE operates with the low power radio. In a conventional UE, the MR is responsible for attaining service from its serving radio network (e.g., gNB). The UE can offload some MR functionalities to the LR to conserve power, which allows the MR to remain in the sleep mode when the UE is in the coverage of the LR. The LR uses a low-power signal giving it the advantage of low power consumption, but this comes at a cost of reduced capabilities of the LR as compared to that of the MR in the UE.

The LR of a conventional UE is incapable of UL transmissions, and thus, the UE needs to wake up the MR if there is any UL data to transmit. Typically, the LR is designed to be a receive only radio, causing the MR to wake up frequently for UL transmissions. Given that the LR is incapable of any transmissions, the MR needs to be awake to transmit any UL data, and the UL transmissions may include signaling data, control elements, a SR and/or a BSR transmission, user data transmissions, measurement reporting (e.g., CSI, RRM, etc.). Further, the wake up time of the MR in a UE from ultra-deep sleep state includes the ramp-up time of the MR plus the time taken for synchronization, which could be as high as 800 ms. This means that the UE might need to wait up to 800 ms before some UL transmission can be performed if the MR had been in ultra-deep sleep state when UL data entered its buffers. This adds a considerable latency in data transmission, which may affect user experience, particularly for delay sensitive services, such as XR services.

Aspects of this disclosure include implementations that provide the LR of a UE can transmit UL data in UL transmissions so that the MR of the UE may remain in the sleep mode for a maximum possible time, allowing for increased power saving gain. Accordingly, the LR of the UE can facilitate UL transmissions, and the UE can maximize its power saving gain while also avoiding any additional latencies that may be caused by the wake up of the MR of the UE. Features of the described aspects provide that the LR of a UE can transmit UL data based on the urgency and/or priority of the UL data. This overcomes notable disadvantages of a conventional UE, including the power saving gain offered by having the LR is minimized when the MR needs to frequently wake up for UL transmissions. The wake up time of MR from ultra deep-sleep includes the ramp up time and the time taken for synchronization, which adds a considerable latency for UL transmission if the MR has to wake-up from ultra deep-sleep. Further, the MR of the UE cannot remain in the sleep state even if the UL data that needs to be transmitted is of low urgency and/or priority and does not need to be immediately transmitted.

Aspects of this disclosure include LCH configuration. A LR of a UE may be configured for UL transmission, which can alleviate some of the wireless communications load on the MR, while also maximizing the power saving gain provided by using the LR. The MR may remain in a standby state (e.g., a sleep mode) until use of the MR is initiated, in which case the MR transitions to an operation state (e.g., wake up mode) for UL transmissions of the wireless communications data. In implementations, the MR may be deemed necessary in terms of the urgency and/or priority of the UL data, the total size of the data in the UL buffers, the delay-budget of the data, and/or the LCH priority in which the data has arrived. One way in which this can be achieved is by configuring particular LCHs to the LR, other particular LCHs to the MR, and some common LCHs configured to both the LR and the MR.

FIG. 2 illustrates an example IE 200 in accordance with aspects of the present disclosure. In an implementation, the LogicalChannelConfig IE can be configured with a RRC message by way of a new parameter, allowedRadio-mode 202 as shown in the example LogicalChannelConfig IE. This parameter, allowedRadio-mode, may indicate whether only a LR mode is allowed, only a MR mode is allowed, or both of the LR mode and the MR mode are allowed.

In other implementations, this new parameter allowedRadio-mode may be a Boolean value, where a 'True' value indicates that a LCH supports UL transmission by the LR only, or a 'False' value indicates that the LCH supports UL transmission by the MR. If the LCH supports UL transmission by the MR, this may include the LR only for UL transmission, or both the LR and the MR for UL transmission. In this example, if a Boolean value of 'False' is configured for an LCH, and data arrives in the LCH, the MR can be woken up for transmission of all data within the LCH.

Further, logical channel prioritization (LCP) may be performed based on a Bj value (e.g., a bucket size value) maintained for each LCH j. Here, the RRC message may include indications to set the prioritized bit rate (PBR) and bucket size duration (BSD) to high values for urgent and/or high-priority data, and to low values otherwise on a per LCH basis for each MAC entity. Additionally, when allocating a resource to the LR for UL transmission, the MAC entity can take into consideration those LCHs that have LR configured for it. For example, when a UE receives an UL grant on the LR, the MAC entity can choose an LCH based on its Bj value (i.e., the priority of the LCH) provided that the LCH is configured with the LR mode for UL transmission, either as LR only, or as LR and MR for UL transmission. In one or more implementations, if the LR transmits urgent data, the LCH configured for the LR may be given high LCP values so as to receive a larger grant more quickly, or vice-versa if the LR transmits lower priority data.

Additional aspects of this disclosure include transmission behavior of a UE using the LR and/or the MR of the device. In these implementations, either the LR or the MR may transmit UL data based on certain criteria, where this criteria is used to distinguish whether the data is urgent or not. Accordingly, the LR can assist the MR with UL transmission, enabling the MR to remain in a sleep mode (e.g., ultra-deep sleep, deep sleep, light sleep, or micro sleep mode) as long as the LR is actively receiving and transmitting, in turn increasing the power saving gain offered by the LR. In an implementation, the LR may be restricted to conduct UL transmissions only when data enters the HARQ buffer while the MR is already in the sleep mode, and/or when new data enters the buffer that was previously empty.

In another implementation, the LR and the MR may be simultaneously awake and may each transmit data based on the urgency and/or priority criteria thresholds, respectively. This feature may be useful if there is a mix of delay-sensitive, urgent data with non-urgent data, where transmission by a single radio could lead to transmissions of the urgent data being delayed. Hence, making use of the two radios simultaneously may be beneficial for delay-sensitive data traffic provided that the network can grant the UE with the required resources, although this implementation may not provide the maximum power saving gain.

In an example, the UE receives UL data in the HARQ buffer, and the LR may be configured to transmit only urgent data, as well as the MR can be subsequently switched on when non-urgent data is received in the buffer. Once the MR is fully awake for UL transmission, the LR may be switched to a sleep mode, provided that the LR has finished transmitting the last urgent data packet that entered the data buffer before the wake up of the MR. The MR can then take over all UL transmissions (urgent and non-urgent) until the next time that the MR switches back to the sleep mode.

In another example, the LR transmits only non-urgent data. If the UE receives urgent data in the HARQ buffer, then the MR is woken up and the MR takes over all of the UL transmissions (urgent and non-urgent). The LR may then switch to the sleep mode after transmitting the last non-urgent packet that entered the buffer before the wake-up of the MR. This feature may be implemented if the UL transmission by the LR is less reliable (e.g., due to lower coverage of the LR as compared to the MR, or the waveform and/or signal used by the LR was for UL transmissions, etc.).

In one or more implementations, the criteria for differentiating between urgent and non-urgent data may be based on the PDU delay budget (PDB) or the PDU set delay budget (PSDB) for a PDU set of the data. Accordingly, a PDU or PDU set with a small PDB or PSDB can be considered high priority or urgent data, while a PDU or PDU set with a large PDB or PSDB can be considered low priority or non-urgent data. A delay budget-based threshold can be maintained by the UE such that if the PDB or the PSDB of the data that is received in the HARQ buffer is below this threshold, or if the data is a MAC CE, then the data is considered as urgent and transmitted accordingly.

In other implementations, the priority of the data may be classified by its logical channel priority. Accordingly, a new priority threshold may be maintained such that for LCHs with a LCH priority below the configured priority threshold, the data is considered as non-urgent, whereas for data of LCHs and/or MAC CEs for which the priority is exceeding this threshold, the data is considered as urgent for UL transmissions. In an event that the UE HARQ buffer is quickly filled with a larger amount of data, then the LR may not be capable enough to transmit all of the data in the UL transmissions. Hence, another data-size based threshold may be maintained such that if the amount of the data in the HARQ buffer exceeds this threshold, the MR is woken up for the UL transmissions, otherwise, the LR can continue to transmit the data until this threshold is met. In various implementations, the differentiation of urgent versus non-urgent data may be based on a combination of one or more of the criteria mentioned above, to include delay-budget based, LCH priority-based, and/or data-size based. As further described herein, data that is transmitted by the LR of a UE is also referred to herein as 'LR data'.

Additional aspects of this disclosure include triggering or initiating a scheduling request. In implementations, and for the LR of a UE to be able to transmit UL data, the LR needs to receive the necessary grant for physical uplink shared channel (PUSCH) resources from its serving network node (i.e., the gNB). The LR needs to transmit a BSR in order for the gNB to grant these necessary resources to the UE. If the UE does not have any grant on which it can transmit the BSR, a SR can be triggered or initiated. The RRC message can configure a set of PUCCH resources (SR configuration) to the UE on a per LCH basis, where each SR configuration corresponds to one or more LCHs, or a MAC CE, depending on the type of MAC CE. For the LR of a UE, the SR configuration of the LCH that triggered the BSR is considered the corresponding SR configuration for the triggered SR.

In one or more implementations, when the LR of a UE triggers a SR, PUCCH formats 0 or 1 may be used to transmit the SR, where this is a SR only PUCCH message and PUCCH formats 0 or 1 may contain up to 2 UCI bits. In the SR transmission occasion within a PUCCH message format 0 or 1, one UCI bit is allocated for the SR (as described below). The spare UCI bit within the SR transmission occasion can be used to distinguish between whether the LR or the MR of the UE triggered the SR. For example, a spare UCI bit value '0' may indicate that the LR triggered the SR, whereas a spare UCI bit value '1' may indicate that the MR triggered the SR. In another example, the PUCCH sparsity (SR configuration) may also be adjusted for the LR such that the power saving gain is maximized.

With reference to PUCCH resource sets, a UE can be configured with up to four sets of PUCCH resources in a PUCCH-Config. A PUCCH resource set is provided by PUCCH-ResourceSet and is associated with a PUCCH resource set index provided by pucch-ResourceSetId, with a set of PUCCH resource indexes provided by resourceList that provides a set of pucch-ResourceId used in the PUCCH resource set, and with a maximum number of UCI information bits the UE can transmit using a PUCCH resource in the PUCCH resource set provided by maxPayloadSize. For the first PUCCH resource set, the maximum number of UCI information bits is 2. A maximum number of PUCCH resource indexes for a set of PUCCH resources is provided by maxNrofPUCCH-ResourcesPerSet. The maximum number of PUCCH resources in the first PUCCH resource set is 32. If the UE transmits $O_{UCI}$ UCI information bits, that include HARQ-acknowledge (ACK) information bits, the UE determines a PUCCH resource set to be a first set of PUCCH resources with pucch-ResourceSetId=0 if $O_{UCI} \leq 2$ including 1 or 2 HARQ-ACK information bits and a positive or negative SR on one SR transmission occasion if transmission of HARQ-ACK information and SR occurs simultaneously.

In other implementations, the LR of a UE may be restricted to certain LCHs such that the SR triggered by a particular LCH implicitly implies that the gNB needs to grant PUSCH resources on the LR. This method can be implemented with the LCH priority criteria for differentiating LR data from other data as described above. Furthermore, each LCH may also be configured with more than one SR configuration, where one SR configuration corresponds to the LR, and one corresponds to the MR. This enables the gNB to implicitly deduce which radio triggered the SR based on the PUCCH resources on which it receives the SR. Here also, the SR configuration for LR may be intelligently configured to maximize the power saving gain (e.g., sparse PUCCH resources).

Additional aspects of this disclosure include buffer status reporting. When a LCH triggers a BSR for data that would be transmitted by the LR of a UE, the LR transmits the BSR (also referred to herein as 'LR-BSR') as and when it has the opportunity to do so. The LR-BSR indicates the total amount of data in the UL buffer is inclusive of LR and non-LR data. The RRC message configures the LR with parameters to control the LR-BSR, namely retxBSR-Timer, periodicBSR-Timer, and additionalBSR-TableAllowed. In one more implementations, these parameters may be commonly set across the LR and the MR, and reconfigured as and when needed or utilized (e.g., when the MR switches on and takes over all of the UL transmissions). Alternatively, these parameters may be separately configured by the RRC for the LR and the MR such that the parameters set for the LR are disabled when the LR switches to a sleep mode and the parameters set for the MR are used when the MR is awake and operational. The retxBSR-Timer parameter is started or restarted when a regular LR-BSR is transmitted, or when the UE receives a grant for transmission of new LR data on any PUSCH resource. If the buffer status reporting procedure determines that at least one BSR has been triggered and not canceled, and if UL-SCH resources are available for a new transmission and the UL-SCH resources can accommodate the LR-BSR MAC CE plus its sub-header as a result of logical channel prioritization, the periodicBSR-Timer is started or restarted except when all of the generated BSRs are long or short truncated or are extended long or short truncated BSRs.

All of the triggered LR-BSR and/or BSRs may be cancelled when the UL grant(s) can accommodate all pending data available for transmission, but is not sufficient to additionally accommodate the LR-BSR or BSR MAC CE plus its sub-header. All of the LR-BSR and/or BSRs triggered prior to MAC PDU assembly shall be cancelled when a MAC PDU is transmitted and this PDU includes a long, refined long, extended long, short, or extended short BSR MAC CE, which contains buffer status up to (and including) the last event that triggered a LR-BSR or BSR prior to the MAC PDU assembly. The MAC PDU assembly can happen at any point in time between uplink grant reception and actual transmission of the corresponding MAC PDU. The LR-BSR or BSR, and the SR, can be triggered or initiated after the assembly of a MAC PDU which contains a LR-BSR or BSR MAC CE, but before the transmission of this MAC PDU. In addition, the LR-BSR or BSR, and the SR, can be triggered during MAC PDU assembly.

In one or more implementations, the triggering conditions for a LR-BSR include: if the UL LR data belongs to a LCH with higher priority than the priority of any LCH containing available UL LR data which belongs to any LCG, then a regular LR-BSR is triggered; if some new UL LR data has entered the buffer which was previously empty, then a regular LR-BSR will be triggered; if UL resources are allocated to the LR, and a number of padding bits is equal to or larger than the size of the LR-BSR MAC CE plus its sub-header, then the LR-BSR is referred below to as 'padding LR-BSR': if the retxBSR-Timer expires, and at least one of the logical channels which belong to an LCG contains UL LR data, then the LR-BSR is referred below to as 'regular LR-BSR', and if the periodicBSR-Timer expires, then the LR-BSR is referred below to as 'periodic LR-BSR.' Further, when regular LR-BSR triggering events occur for multiple logical channels containing LR data simultaneously, each logical channel triggers one separate regular LR-BSR. In implementations, the LCHs that contain LR data may be grouped into one LCG, where the BSR MAC CE transmitted by the LR can be identified by the gNB as a LR-BSR MAC CE by means of the LCG identifier (ID) in the MAC CE header.

Figure 3:
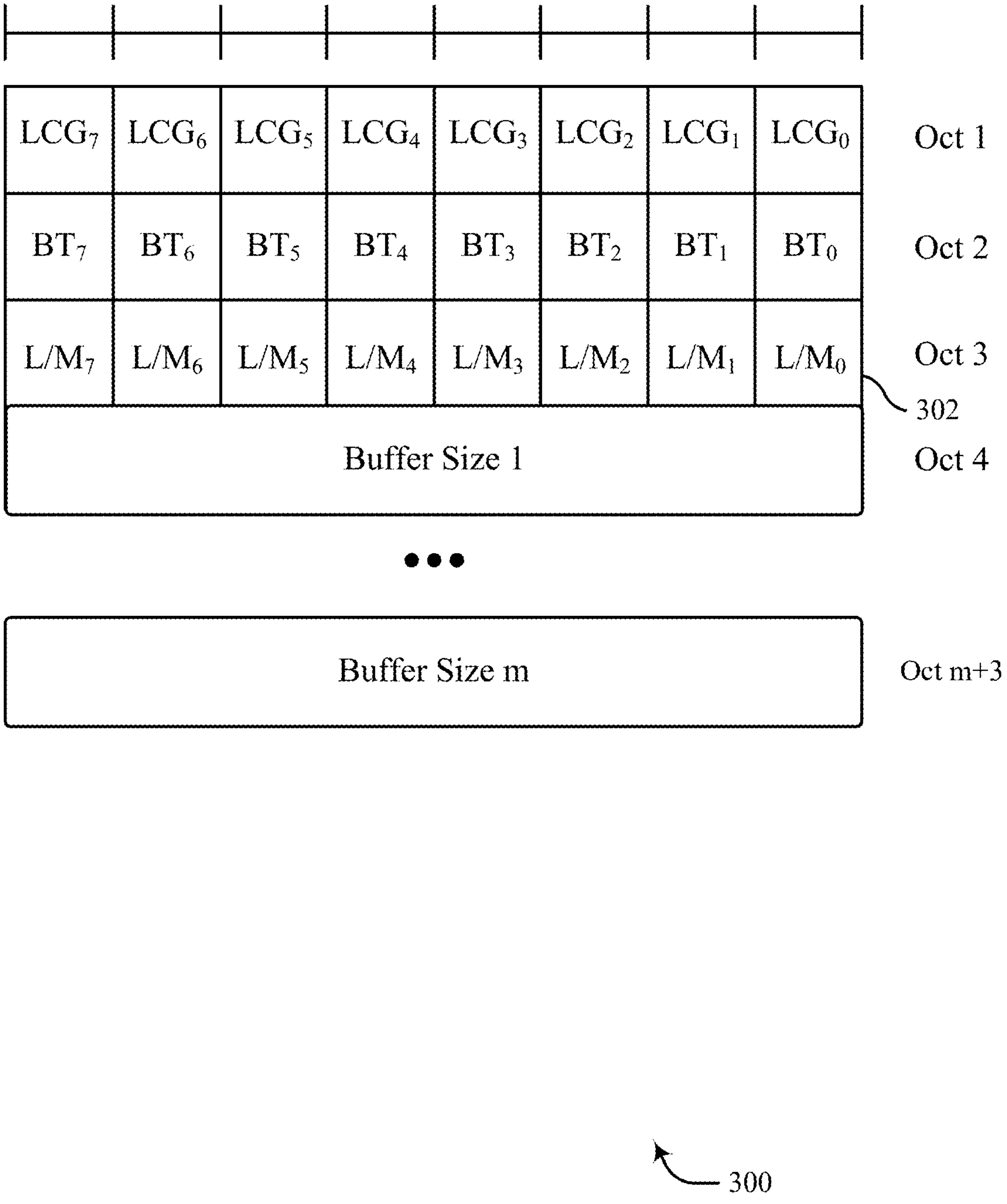
FIG. 3 illustrates an example of a low power radio (LR) refined long buffer status report (BSR) MAC control element (CE), in accordance with aspects of the present disclosure.

FIG. 3 illustrates an example 300 of a LR refined long BSR MAC CE, in accordance with aspects of the present disclosure. In this example, implementation, the LR-BSR MAC CE may contain an additional octet 302 to indicate the data type per LCG within the buffer status report. This indication may be a flag that indicates whether the data in that LCG is of LR data, MR data, or both. For example, the figure illustrates how the refined long BSR MAC CE may be modified with the additional octet 302 indicating whether the LCG contains LR data or MR data, where a bit value '0' indicates MR data and bit value '1' indicates LR data. Here, the MR data may mean either only MR data or a mix of MR and LR data, in which case the MR would need to be awake for UL transmission of the data.

Figure 4:
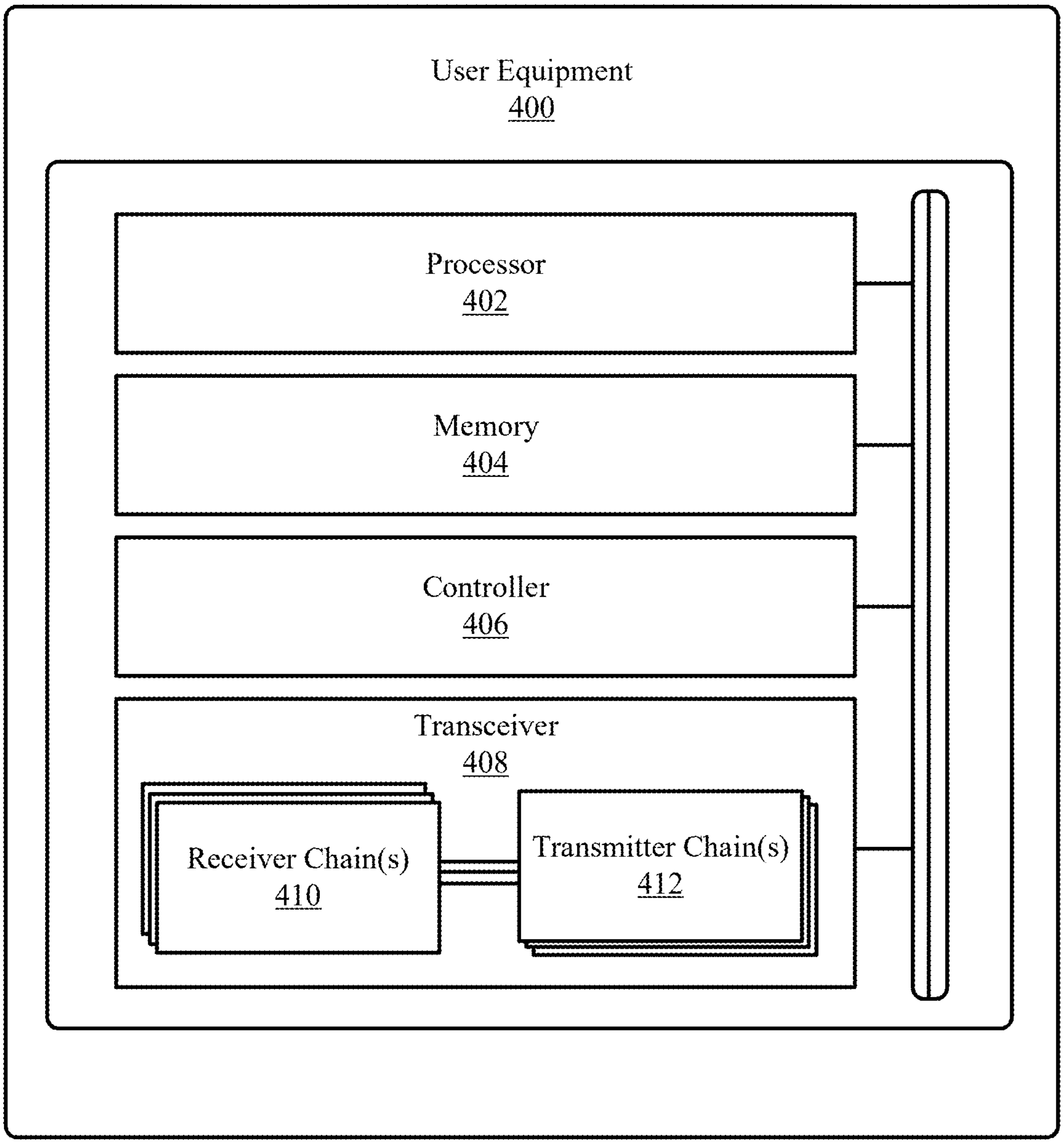
FIG. 4 illustrates an example of a UE in accordance with aspects of the present disclosure.

FIG. 4 illustrates an example of a UE 400 in accordance with aspects of the present disclosure. The UE 400 may include a processor 402, a memory 404, a controller 406, and a transceiver 408. The processor 402, the memory 404, the controller 406, or the transceiver 408, or various combinations thereof or various components thereof may be examples of means for performing various aspects of the present disclosure as described herein. These components may be coupled (e.g., operatively, communicatively, functionally, electronically, electrically) via one or more interfaces.

The processor 402, the memory 404, the controller 406, or the transceiver 408, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 402 may include an intelligent hardware device (e.g., a general-purpose processor, a DSP, a CPU, an ASIC, an FPGA, or any combination thereof). In some implementations, the processor 402 may be configured to operate the memory 404. In some other implementations, the memory 404 may be integrated into the processor 402. The processor 402 may be configured to execute computer-readable instructions stored in the memory 404 to cause the UE 400 to perform various functions of the present disclosure.

The memory 404 may include volatile or non-volatile memory. The memory 404 may store computer-readable, computer-executable code including instructions when executed by the processor 402 cause the UE 400 to perform various functions described herein. The code may be stored in a non-transitory computer-readable medium such as the memory 404 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 402 and the memory 404 coupled with the processor 402 may be configured to cause the UE 400 to perform one or more of the functions described herein (e.g., executing, by the processor 402, instructions stored in the memory 404). For example, the processor 402 may support wireless communication at the UE 400 in accordance with examples as disclosed herein. The UE 400 may be configured to or operable to support a means for receiving UL data into a MAC HARQ buffer; waking up a low power radio of the UE based at least in part on the UL data received in the MAC HARQ buffer; initiating at least one of a buffer status report or a scheduling request; and transmitting, to a NE, at least one of the buffer status report or the scheduling request.

Additionally, the UE 400 may be configured to support any one or combination of the method further comprising receiving, from the NE, a RRC message that indicates a configuration of a radio mode associated with a LCH via which the UL data is received. The method further comprising receiving, from the NE, a LogicalChannelConfig IE that includes a parameter to configure a radio mode associated with a LCH via which the UL data is received. The parameter is an enumerated value indicating the low power radio, a main radio, or both the low power radio and the main radio. The parameter is a Boolean value of true indicating the low power radio, or a Boolean value of false indicating at least one of a main radio, or both the low power radio and the main radio. The LCH via which the UL data is received is configured with the Boolean value of false, and the at least one processor is configured to cause the UE to wake up the main radio for UL transmission of the UL data. A LCH with a high priority is configurable with a high bucket size value that is a product of a prioritized bit rate and a bucket size duration. The method further comprising transmitting the scheduling request as one of a PUCCH message with an indication that the low power radio initiated the scheduling request, or as the PUCCH message dedicated for a LCH configured for low power radio mode. The method further comprising transmitting the buffer status report that includes an indication that the UL data in a LCG is one of only associated with the low power radio, or associated with a main radio, or both the low power radio and the main radio. The method further comprising receiving an UL grant; and allocating the UL grant to the LCH based on LCH priority and if a radio mode configured for the LCH is at least one of the low power radio, or both the low power radio and a main radio.

Additionally, or alternatively, the UE 400 may support at least one memory (e.g., the memory 404) and at least one processor (e.g., the processor 402) coupled with the at least one memory and configured to cause the UE to receive UL data into a MAC HARQ buffer; wake up a low power radio of the UE based at least in part on the UL data received in the MAC HARQ buffer; initiate at least one of a buffer status report or a scheduling request; and transmit, to a NE, at least one of the buffer status report or the scheduling request.

Additionally, the UE 400 may be configured to support any one or combination of a LCH via which the UL data is received is configured with a radio mode. The at least one processor is configured to cause the UE to receive, from the NE, a RRC message that indicates a configuration of the radio mode. The at least one processor is configured to cause the UE to receive, from the NE, a LogicalChannelConfig IE that includes a parameter to configure the radio mode. The parameter is an enumerated value indicating the low power radio, a main radio, or both the low power radio and the main radio. The parameter is a Boolean value of true indicating the low power radio, or a Boolean value of false indicating at least one of a main radio, or both the low power radio and the main radio. The LCH via which the UL data is received is configured with the Boolean value of false, and the at least one processor is configured to cause the UE to wake up the main radio for UL transmission of the UL data. A LCH with a high priority is configurable with a high bucket size value that is a product of a prioritized bit rate and a bucket size duration. The at least one processor is configured to cause the UE to receive an UL grant; and allocate the UL grant to the LCH based on LCH priority and if a radio mode configured for the LCH is at least one of the low power radio, or both the low power radio and a main radio. The at least one processor is configured to cause the UE to transmit the scheduling request as one of a PUCCH message with an indication that the low power radio initiated the scheduling request, or as the PUCCH message dedicated for a LCH configured for low power radio mode. The at least one processor is configured to cause the UE to transmit the buffer status report that includes an indication that the UL data in a LCG is one of only associated with the low power radio, or associated with a main radio, or both the low power radio and the main radio.

The controller 406 may manage input and output signals for the UE 400. The controller 406 may also manage peripherals not integrated into the UE 400. In some implementations, the controller 406 may utilize an operating system such as iOS®, ANDROID®, WINDOWS®, or other operating systems. In some implementations, the controller 406 may be implemented as part of the processor 402.

In some implementations, the UE 400 may include at least one transceiver 408. In some other implementations, the UE 400 may have more than one transceiver 408. The transceiver 408 may represent a wireless transceiver. The transceiver 408 may include one or more receiver chains 410, one or more transmitter chains 412, or a combination thereof.

A receiver chain 410 may be configured to receive signals (e.g., control information, data, packets) over a wireless medium. For example, the receiver chain 410 may include one or more antennas to receive a signal over the air or wireless medium. The receiver chain 410 may include at least one amplifier (e.g., a low-noise amplifier (LNA)) configured to amplify the received signal. The receiver chain 410 may include at least one demodulator configured to demodulate the receive signal and obtain the transmitted data by reversing the modulation technique applied during transmission of the signal. The receiver chain 410 may include at least one decoder for decoding the demodulated signal to receive the transmitted data.

A transmitter chain 412 may be configured to generate and transmit signals (e.g., control information, data, packets). The transmitter chain 412 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 412 may also include at least one power amplifier configured to amplify the modulated signal to an appropriate power level suitable for transmission over the wireless medium. The transmitter chain 412 may also include one or more antennas for transmitting the amplified signal into the air or wireless medium.

Figure 5:
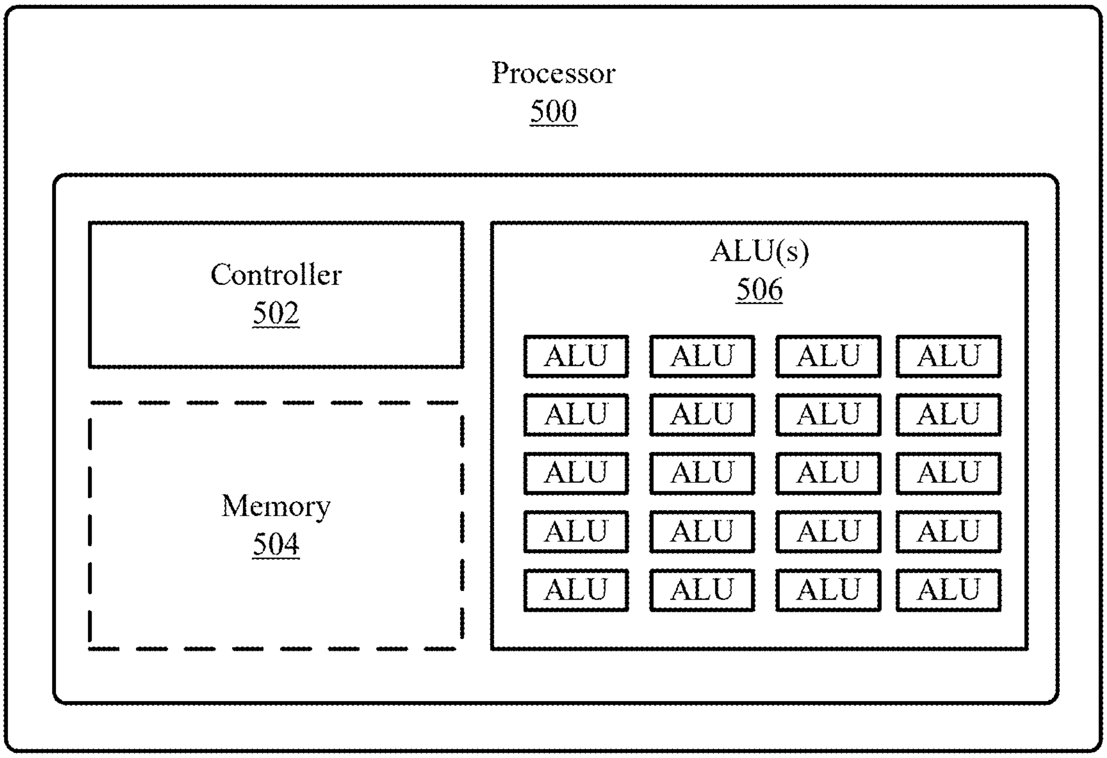
FIG. 5 illustrates an example of a processor in accordance with aspects of the present disclosure.

FIG. 5 illustrates an example of a processor 500 in accordance with aspects of the present disclosure. The processor 500 may be an example of a processor configured to perform various operations in accordance with examples as described herein. The processor 500 may include a controller 502 configured to perform various operations in accordance with examples as described herein. The processor 500 may optionally include at least one memory 504, which may be, for example, an L1/L2/L3 cache. Additionally, or alternatively, the processor 500 may optionally include one or more arithmetic-logic units (ALUs) 506. One or more of these components may be in electronic communication or otherwise coupled (e.g., operatively, communicatively, functionally, electronically, electrically) via one or more interfaces (e.g., buses).

The processor 500 may be a processor chipset and include a protocol stack (e.g., a software stack) executed by the processor chipset to perform various operations (e.g., receiving, obtaining, retrieving, transmitting, outputting, forwarding, storing, determining, identifying, accessing, writing, reading) in accordance with examples as described herein. The processor chipset may include one or more cores, one or more caches (e.g., memory local to or included in the processor chipset (e.g., the processor 500) or other memory (e.g., random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), and others).

The controller 502 may be configured to manage and coordinate various operations (e.g., signaling, receiving, obtaining, retrieving, transmitting, outputting, forwarding, storing, determining, identifying, accessing, writing, reading) of the processor 500 to cause the processor 500 to support various operations in accordance with examples as described herein. For example, the controller 502 may operate as a control unit of the processor 500, generating control signals that manage the operation of various components of the processor 500. These control signals include enabling or disabling functional units, selecting data paths, initiating memory access, and coordinating timing of operations.

The controller 502 may be configured to fetch (e.g., obtain, retrieve, receive) instructions from the memory 504 and determine subsequent instruction(s) to be executed to cause the processor 500 to support various operations in accordance with examples as described herein. The controller 502 may be configured to track memory addresses of instructions associated with the memory 504. The controller 502 may be configured to decode instructions to determine the operation to be performed and the operands involved. For example, the controller 502 may be configured to interpret the instruction and determine control signals to be output to other components of the processor 500 to cause the processor 500 to support various operations in accordance with examples as described herein. Additionally, or alternatively, the controller 502 may be configured to manage flow of data within the processor 500. The controller 502 may be configured to control transfer of data between registers, ALUs 506, and other functional units of the processor 500.

The memory 504 may include one or more caches (e.g., memory local to or included in the processor 500 or other memory, such as RAM, ROM, DRAM, SDRAM, SRAM, MRAM, flash memory, etc. In some implementations, the memory 504 may reside within or on a processor chipset (e.g., local to the processor 500). In some other implementations, the memory 504 may reside external to the processor chipset (e.g., remote to the processor 500).

The memory 504 may store computer-readable, computer-executable code including instructions that, when executed by the processor 500, cause the processor 500 to perform various functions described herein. The code may be stored in a non-transitory computer-readable medium such as system memory or another type of memory. The controller 502 and/or the processor 500 may be configured to execute computer-readable instructions stored in the memory 504 to cause the processor 500 to perform various functions. For example, the processor 500 and/or the controller 502 may be coupled with or to the memory 504, the processor 500, and the controller 502, and may be configured to perform various functions described herein. In some examples, the processor 500 may include multiple processors and the memory 504 may include multiple memories. One or more of the multiple processors may be coupled with one or more of the multiple memories, which may, individually or collectively, be configured to perform various functions herein.

The one or more ALUs 506 may be configured to support various operations in accordance with examples as described herein. In some implementations, the one or more ALUs 506 may reside within or on a processor chipset (e.g., the processor 500). In some other implementations, the one or more ALUs 506 may reside external to the processor chipset (e.g., the processor 500). One or more ALUs 506 may perform one or more computations such as addition, subtraction, multiplication, and division on data. For example, one or more ALUs 506 may receive input operands and an operation code, which determines an operation to be executed. One or more ALUs 506 may be configured with a variety of logical and arithmetic circuits, including adders, subtractors, shifters, and logic gates, to process and manipulate the data according to the operation. Additionally, or alternatively, the one or more ALUs 506 may support logical operations such as AND, OR, exclusive-OR (XOR), not-OR (NOR), and not-AND (NAND), enabling the one or more ALUs 506 to handle conditional operations, comparisons, and bitwise operations.

The processor 500 may support wireless communication in accordance with examples as disclosed herein. The processor 500 may be configured to or operable to support at least one controller (e.g., the controller 502) coupled with at least one memory (e.g., the memory 504) and configured to cause the processor to receive UL data into a MAC HARQ buffer; wake up a low power radio based at least in part on the UL data received in the MAC HARQ buffer; initiate at least one of a buffer status report or a scheduling request; and transmit, to a NE, at least one of the buffer status report or the scheduling request.

Additionally, the processor 500 may be configured to or operable to support any one or combination of the LCH via which the UL data is received is configured with a radio mode. The at least one controller is configured to cause the processor to receive, from the NE, a RRC message that indicates a configuration of the radio mode. The at least one controller is configured to cause the processor to receive, from the NE, a LogicalChannelConfig IE that includes a parameter to configure the radio mode. The parameter is an enumerated value indicating at least one of the low power radio, a main radio, or both the low power radio and the main radio. The parameter is a Boolean value of true indicating the low power radio, or a Boolean value of false indicating at least one of a main radio, or both the low power radio and the main radio. The LCH via which the UL data is received is configured with the Boolean value of false, and the at least one controller is configured to cause the processor to wake up the main radio for UL transmission of the UL data. A LCH with a high priority is configurable with a high bucket size value that is a product of a prioritized bit rate and a bucket size duration. The at least one controller is configured to cause the processor to receive an UL grant; and allocate the UL grant to the LCH based on LCH priority and if a radio mode configured for the LCH is at least one of the low power radio, or both the low power radio and a main radio. The at least one controller is configured to cause the processor to transmit the scheduling request as one of a PUCCH message with an indication that the low power radio initiated the scheduling request, or as the PUCCH message dedicated for a LCH configured for low power radio mode. The at least one controller is configured to cause the processor to transmit the buffer status report that includes an indication that the UL data in a LCG is one of only associated with the low power radio, or associated with a main radio, or both the low power radio and the main radio.

Figure 6:
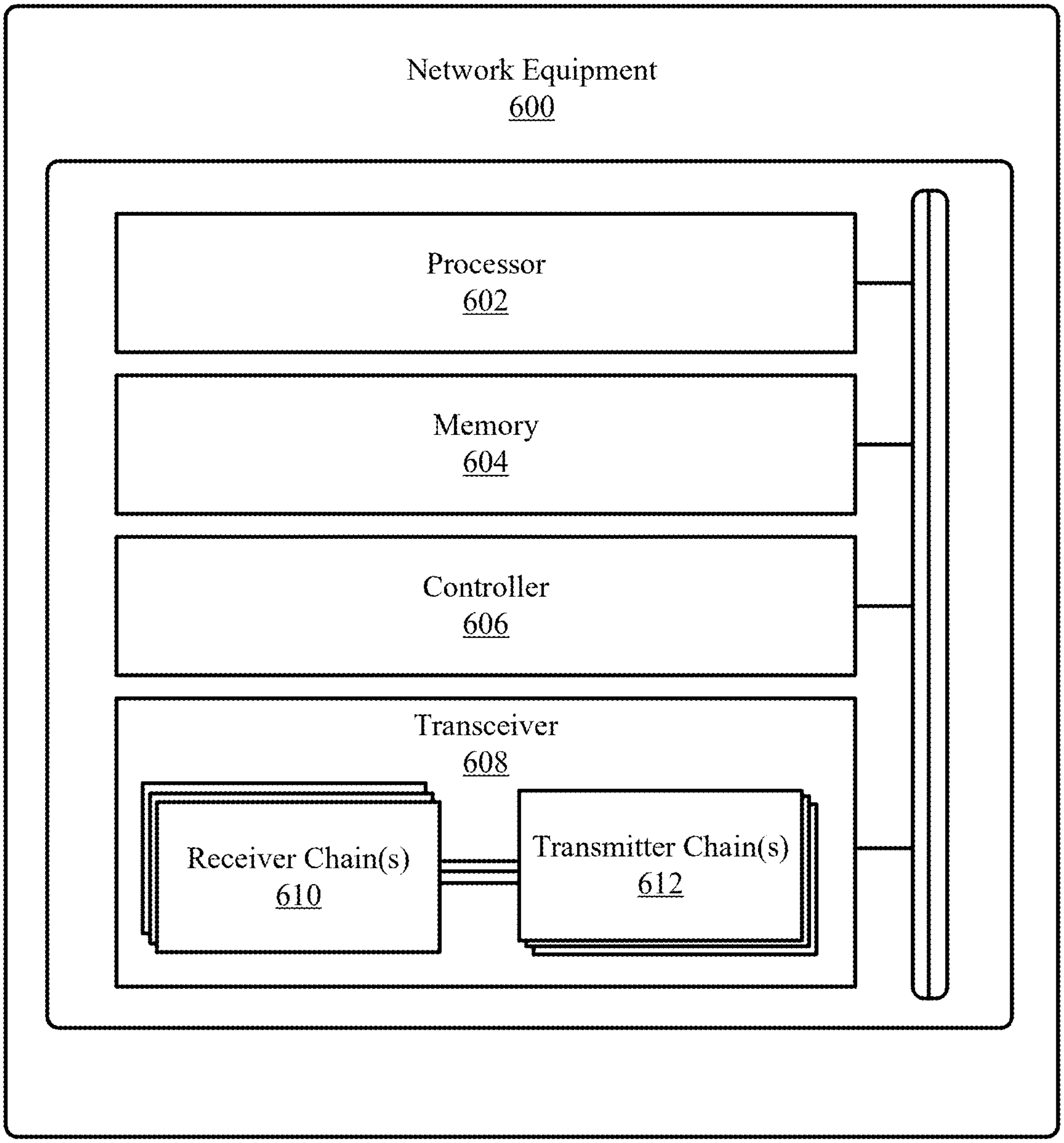
FIG. 6 illustrates an example of a network equipment (NE) in accordance with aspects of the present disclosure.

FIG. 6 illustrates an example of a NE 600 in accordance with aspects of the present disclosure. The NE 600 may include a processor 602, a memory 604, a controller 606, and a transceiver 608. The processor 602, the memory 604, the controller 606, or the transceiver 608, or various combinations thereof or various components thereof may be examples of means for performing various aspects of the present disclosure as described herein. These components may be coupled (e.g., operatively, communicatively, functionally, electronically, electrically) via one or more interfaces.

The processor 602, the memory 604, the controller 606, or the transceiver 608, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 602 may include an intelligent hardware device (e.g., a general-purpose processor, a DSP, a CPU, an ASIC, an FPGA, or any combination thereof). In some implementations, the processor 602 may be configured to operate the memory 604. In some other implementations, the memory 604 may be integrated into the processor 602. The processor 602 may be configured to execute computer-readable instructions stored in the memory 604 to cause the NE 600 to perform various functions of the present disclosure.

The memory 604 may include volatile or non-volatile memory. The memory 604 may store computer-readable, computer-executable code including instructions when executed by the processor 602 cause the NE 600 to perform various functions described herein. The code may be stored in a non-transitory computer-readable medium such as the memory 604 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 602 and the memory 604 coupled with the processor 602 may be configured to cause the NE 600 to perform one or more of the functions described herein (e.g., executing, by the processor 602, instructions stored in the memory 604). For example, the processor 602 may support wireless communication at the NE 600 in accordance with examples as disclosed herein. The NE 600 may be configured to or operable to support a means for receiving, from a UE, at least one of a buffer status report or a scheduling request; and transmitting, to the UE, a configuration of UL resources via which the UE transmits, with a low power radio, UL data from a MAC HARQ buffer of the UE.

Additionally, the NE 600 may be configured to or operable to support any one or combination of the method further comprising transmitting, to the UE, a RRC message that indicates a radio mode configuration of a radio mode that is associated with a LCH for the UL data. The method further comprising transmitting, to the UE, a LogicalChannelConfig IE that includes a parameter to configure a radio mode that is associated with a LCH for the UL data. The method, wherein the parameter is an enumerated value indicating the low power radio of the UE, a main radio of the UE, or both the low power radio and the main radio. The method, wherein the parameter is a Boolean value of true indicating the low power radio of the UE, or a Boolean value of false indicating at least one of a main radio of the UE, or both the low power radio and the main radio.

Additionally, or alternatively, the NE 600 may support at least one memory (e.g., the memory 604) and at least one processor (e.g., the processor 602) coupled with the at least one memory and configured to cause the NE to receive, from a UE, at least one of a buffer status report or a scheduling request; and transmit, to the UE, a configuration of UL resources via which the UE transmits, with a low power radio, UL data from a MAC HARQ buffer of the UE.

Additionally, the NE 600 may be configured to support any one or combination of the at least one processor is configured to cause the NE to transmit, to the UE, a RRC message that indicates a radio mode configuration of a radio mode that is associated with a LCH for the UL data. The at least one processor is configured to cause the NE to transmit, to the UE, a LogicalChannelConfig IE that includes a parameter to configure a radio mode that is associated with a LCH for the UL data. The parameter is an enumerated value indicating the low power radio of the UE, a main radio of the UE, or both the low power radio and the main radio. The parameter is a Boolean value of true indicating the low power radio of the UE, or a Boolean value of false indicating at least one of a main radio of the UE, or both the low power radio and the main radio.

The controller 606 may manage input and output signals for the NE 600. The controller 606 may also manage peripherals not integrated into the NE 600. In some implementations, the controller 606 may utilize an operating system such as iOS®, ANDROID®, WINDOWS®, or other operating systems. In some implementations, the controller 606 may be implemented as part of the processor 602.

In some implementations, the NE 600 may include at least one transceiver 608. In some other implementations, the NE 600 may have more than one transceiver 608. The transceiver 608 may represent a wireless transceiver. The transceiver 608 may include one or more receiver chains 610, one or more transmitter chains 612, or a combination thereof.

A receiver chain 610 may be configured to receive signals (e.g., control information, data, packets) over a wireless medium. For example, the receiver chain 610 may include one or more antennas to receive a signal over the air or wireless medium. The receiver chain 610 may include at least one amplifier (e.g., a low-noise amplifier (LNA)) configured to amplify the received signal. The receiver chain 610 may include at least one demodulator configured to demodulate the receive signal and obtain the transmitted data by reversing the modulation technique applied during transmission of the signal. The receiver chain 610 may include at least one decoder for decoding the demodulated signal to receive the transmitted data.

A transmitter chain 612 may be configured to generate and transmit signals (e.g., control information, data, packets). The transmitter chain 612 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 612 may also include at least one power amplifier configured to amplify the modulated signal to an appropriate power level suitable for transmission over the wireless medium. The transmitter chain 612 may also include one or more antennas for transmitting the amplified signal into the air or wireless medium.

Figure 7:
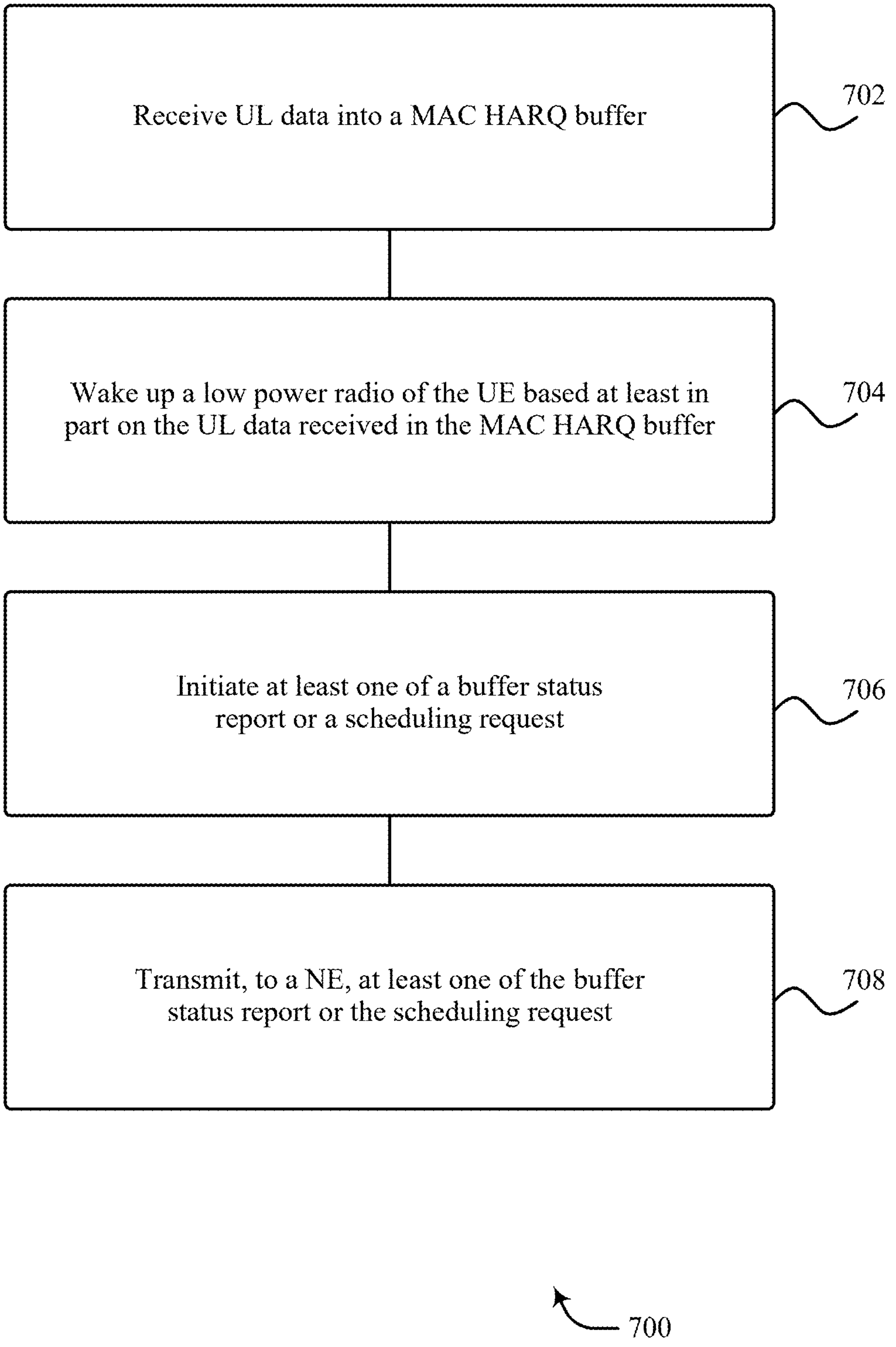
FIG. 7 illustrates a flowchart of a method performed by a UE in accordance with aspects of the present disclosure.

FIG. 7 illustrates a flowchart of a method 700 in accordance with aspects of the present disclosure. The operations of the method may be implemented by a UE as described herein. In some implementations, the UE may execute a set of instructions to control the function elements of the UE to perform the described functions. It should be noted that the method described herein describes a possible implementation, and that the operations and the steps may be rearranged or otherwise modified and that other implementations are possible.

At 702, the method may include receiving UL data into a MAC HARQ buffer. The operations of 702 may be performed in accordance with examples as described herein. In some implementations, aspects of the operations of 702 may be performed by a UE as described with reference to FIG. 4.

At 704, the method may include waking up a low power radio of the UE based at least in part on the UL data received in the MAC HARQ buffer. The operations of 704 may be performed in accordance with examples as described herein. In some implementations, aspects of the operations of 704 may be performed by a UE as described with reference to FIG. 4.

At 706, the method may include initiating at least one of a buffer status report or a scheduling request. The operations of 706 may be performed in accordance with examples as described herein. In some implementations, aspects of the operations of 706 may be performed a UE as described with reference to FIG. 4.

At 708, the method may include transmitting, to a NE, at least one of the buffer status report or the scheduling request. The operations of 708 may be performed in accordance with examples as described herein. In some implementations, aspects of the operations of 708 may be performed a UE as described with reference to FIG. 4.

Figure 8:
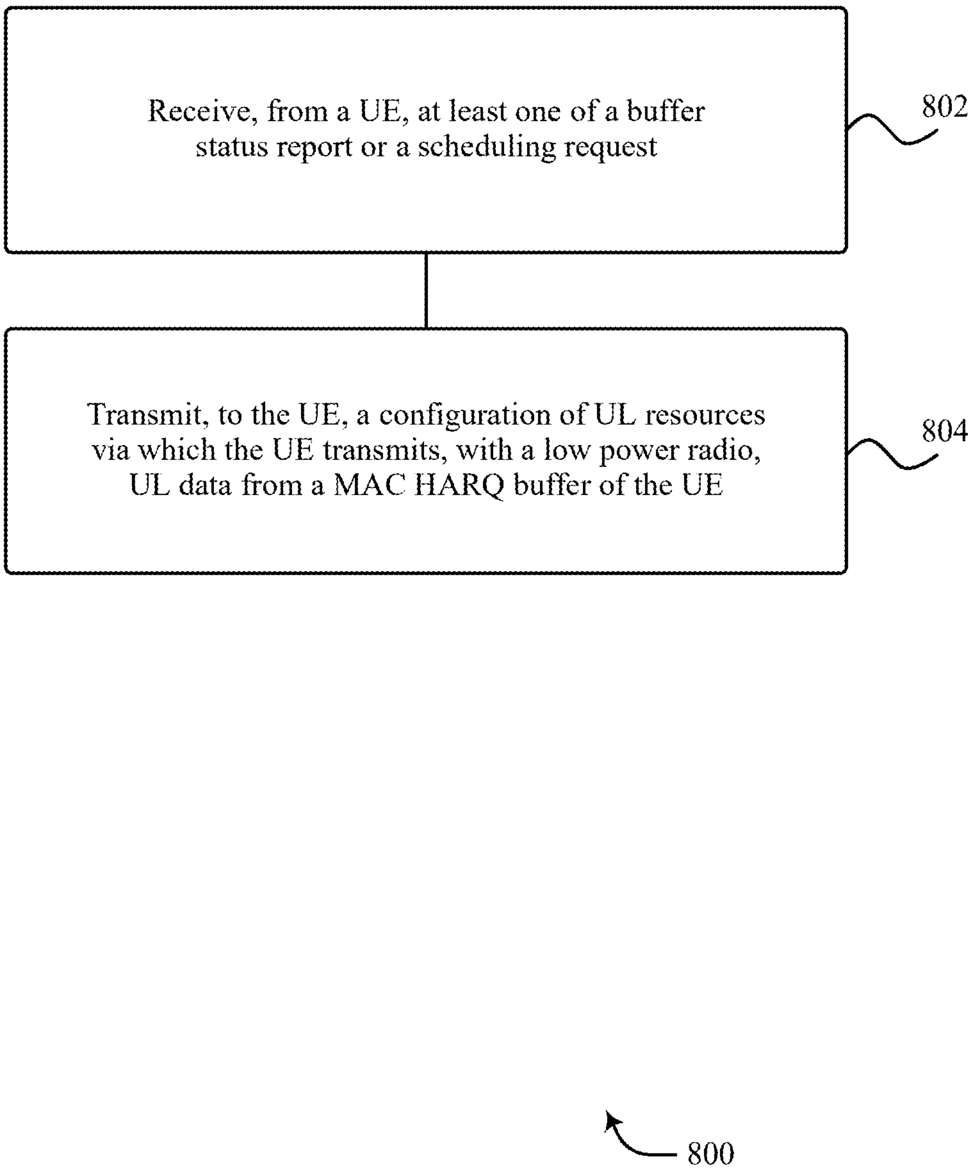
FIG. 8 illustrates a flowchart of a method performed by a NE in accordance with aspects of the present disclosure.

FIG. 8 illustrates a flowchart of a method 800 in accordance with aspects of the present disclosure. The operations of the method may be implemented by a NE as described herein. In some implementations, the NE may execute a set of instructions to control the function elements of the NE to perform the described functions. It should be noted that the method described herein describes a possible implementation, and that the operations and the steps may be rearranged or otherwise modified and that other implementations are possible.

At 802, the method may include receiving, from a UE, at least one of a buffer status report or a scheduling request. The operations of 802 may be performed in accordance with examples as described herein. In some implementations, aspects of the operations of 802 may be performed by a NE as described with reference to FIG. 6.

At 804, the method may include transmitting, to the UE, a configuration of UL resources via which the UE transmits, with a low power radio, UL data from a MAC HARQ buffer of the UE. The operations of 804 may be performed in accordance with examples as described herein. In some implementations, aspects of the operations of 804 may be performed by a NE as described with reference to FIG. 6.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

at least one memory; and at least one processor coupled with the at least one memory and configured to cause the UE to:

receive uplink (UL) data into a medium access control (MAC) hybrid automatic repeat request (HARQ) buffer;

wake up a low power radio of the UE based at least in part on the UL data received in the MAC HARQ buffer;

initiate at least one of a buffer status report or a scheduling request; and transmit, to a network equipment (NE), at least one of the buffer status report or the scheduling request.

2. The UE of claim 1, wherein a logical channel (LCH) via which the UL data is received is configured with a radio mode.

3. The UE of claim 2, wherein the at least one processor is configured to cause the UE to receive, from the NE, a radio resource control (RRC) message that indicates a configuration of the radio mode.

4. The UE of claim 3, wherein the at least one processor is configured to cause the UE to receive, from the NE, a LogicalChannelConfig information element (IE) that includes a parameter to configure the radio mode.

5. The UE of claim 4, wherein the parameter is an enumerated value indicating the low power radio, a main radio, or both the low power radio and the main radio.

6. The UE of claim 4, wherein the parameter is a Boolean value of true indicating the low power radio, or a Boolean value of false indicating at least one of a main radio, or both the low power radio and the main radio.

7. The UE of claim 6, wherein the logical channel (LCH) via which the UL data is received is configured with the Boolean value of false, and the at least one processor is configured to cause the UE to wake up the main radio for UL transmission of the UL data.

8. The UE of claim 1, wherein a logical channel (LCH) with a high priority is configurable with a high bucket size value that is a product of a prioritized bit rate and a bucket size duration.

9. The UE of claim 8, wherein the at least one processor is configured to cause the UE to:

receive an UL grant; and allocate the UL grant to the LCH based on LCH priority and if a radio mode configured for the LCH is at least one of the low power radio, or both the low power radio and a main radio.

10. The UE of claim 1, wherein the at least one processor is configured to cause the UE to transmit the scheduling request as one of a physical uplink control channel (PUCCH) message with an indication that the low power radio initiated the scheduling request, or as the PUCCH message dedicated for a logical channel (LCH) configured for low power radio mode.

11. The UE of claim 1, wherein the at least one processor is configured to cause the UE to transmit the buffer status report that includes an indication that the UL data in a logical channel group (LCG) is one of only associated with the low power radio, or associated with a main radio, or both the low power radio and the main radio.

12. A processor for wireless communication, comprising:

at least one controller coupled with at least one memory and configured to cause the processor to:

receive uplink (UL) data into a medium access control (MAC) hybrid automatic repeat request (HARQ) buffer;

wake up a low power radio based at least in part on the UL data received in the MAC HARQ buffer;

initiate at least one of a buffer status report or a scheduling request; and transmit, to a network equipment (NE), at least one of the buffer status report or the scheduling request.

13. A method performed by a user equipment (UE), the method comprising:

receiving uplink (UL) data into a medium access control (MAC) hybrid automatic repeat request (HARQ) buffer;

waking up a low power radio of the UE based at least in part on the UL data received in the MAC HARQ buffer;

initiating at least one of a buffer status report or a scheduling request; and transmitting, to a network equipment (NE), at least one of the buffer status report or the scheduling request.

14. The method of claim 13, further comprising receiving, from the NE, a radio resource control (RRC) message that indicates a configuration of a radio mode associated with a logical channel (LCH) via which the UL data is received.

15. The method of claim 13, further comprising receiving, from the NE, a LogicalChannelConfig information element (IE) that includes a parameter to configure a radio mode associated with a logical channel (LCH) via which the UL data is received.

16. A network equipment (NE) for wireless communication, comprising:

at least one memory; and at least one processor coupled with the at least one memory and configured to cause the NE to:

receive, from a user equipment (UE), at least one of a buffer status report or a scheduling request; and transmit, to the UE, a configuration of uplink (UL) resources via which the UE transmits, with a low power radio, UL data from a medium access control (MAC) hybrid automatic repeat request (HARQ) buffer of the UE.

17. The NE of claim 16, wherein the at least one processor is configured to cause the NE to transmit, to the UE, a radio resource control (RRC) message that indicates a radio mode configuration of a radio mode that is associated with a logical channel (LCH) for the UL data.

18. The NE of claim 16, wherein the at least one processor is configured to cause the NE to transmit, to the UE, a LogicalChannelConfig information element (IE) that includes a parameter to configure a radio mode that is associated with a logical channel (LCH) for the UL data.

19. The NE of claim 18, wherein the parameter is an enumerated value indicating the low power radio of the UE, a main radio of the UE, or both the low power radio and the main radio.

20. The NE of claim 18, wherein the parameter is a Boolean value of true indicating the low power radio of the UE, or a Boolean value of false indicating at least one of a main radio of the UE, or both the low power radio and the main radio.

* * * * *